United States Patent [19]
Unruh et al.

[11] 3,871,635
[45] Mar. 18, 1975

[54] SUSPENSION HYDRAULIC ROLL STABILIZER WITH LEVELING

[75] Inventors: Dale H. Unruh, Peoria, Ill.; Jan B. Yates, Reynoldsburg, Ohio

[73] Assignee: Caterpillar Tractor Co., Peoria, Ill.

[22] Filed: Jan. 23, 1974

[21] Appl. No.: 435,761

[52] U.S. Cl. ................................ 267/11, 267/65 D
[51] Int. Cl. ............................................ B60g 21/00
[58] Field of Search ..................... 267/65 D, 11 A

[56] References Cited
UNITED STATES PATENTS

| | | | |
|---|---|---|---|
| 2,779,587 | 1/1957 | Thomas | 267/11 A |
| 3,090,611 | 5/1963 | Schultze | 267/11 A |
| 3,649,043 | 3/1972 | Higginbotham | 267/11 A |
| 3,736,000 | 5/1973 | Capgras | 267/65 D |

Primary Examiner—James B. Marbert
Attorney, Agent, or Firm—Caterpillar Tractor Co.

[57] ABSTRACT

A suspension system for the sprung mass of a vehicle supported on wheels in which hydraulic struts are cross-connected across the vehicle for stability; each cross connection provided with a gas-charged accumulator providing a spring rate for each hydraulic system; and in which leveling of the sprung mass relative to wheeled supports is accomplished by selective transfer of hydraulic fluid between otherwise closed cross-connected strut systems. Use is for off-highway as well as on-highway trucks, wagons and other vehicles.

7 Claims, 1 Drawing Figure

PATENTED MAR 18 1975  3,871,635
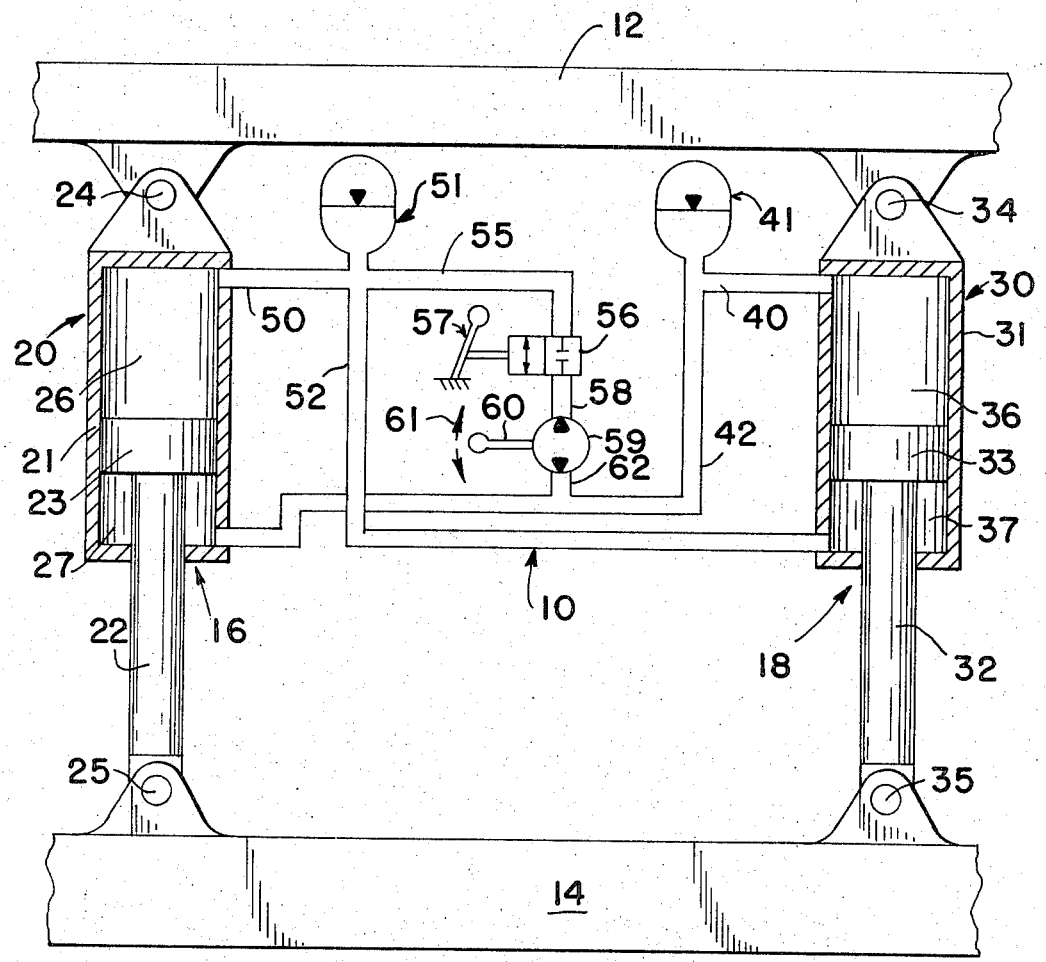

SUSPENSION HYDRAULIC ROLL STABILIZER WITH LEVELING

BACKGROUND OF THE INVENTION

Conventional hydraulic strut-type suspension systems have been used in which the same ends of struts opposite each other across the vehicle are connected so that the same hydraulic pressure will exist in the same ends of the struts. Typical of such systems are those illustrated in British Pat. No. 1,311,646 (1973) and German Pat. No. 1,530,531 (1973). In such systems, provisions are made for adding hydraulic fluid to the struts to raise the sprung vehicle mass relative to its wheels or to extract hydraulic fluid for lowering the mass. Any leakage internally of a strut past a piston is of no consequence and has no effect on the level position of the sprung mass relative to its wheeled support.

Other known systems of suspension include cross-connected hydraulic struts wherein the upper end hydraulic chamber of a strut on the righthand side of the vehicle is connected to the lower hydraulic chamber of a strut on the lefthand side of the vehicle and the other ends of the struts similarly cross-connected. Such cross connection of the hydraulic chambers gains resistance to rolling of the mass relative to its wheels due to the vertical component of side thrust occurring on the occasion of a vehicle moving in other than a straight line. While there is a gain in roll resistant stiffness, vertical stiffness is not materially affected and thus ride characteristics remain substantially the same. Typical of the above described systems are those illustrated in British Pat. No. 1,335,758 (1973) and U.S. Pat. No. 3,328,019 (1967).

A difficulty exists with cross-connected hydraulic strut systems in that shock loads often applied to the struts, inherent wear through use, temperature variations and the like, often allow hydraulic fluid leakage past the piston of one strut more than occurs past another strut piston. Such leakage may lead to an unlevel suspension of the sprung mass relative to its wheeled support. Any leakage past a strut piston may change the volume of the contained hydraulic fluid in one cross-connected system causing one strut to extend further than its counterpart across the vehicle, leading to an undesired unlevel condition of the sprung mass relative to its wheels.

SUMMARY OF THE INVENTION

The principal object of this invention is to provide a hydraulic suspension system for the sprung mass of a vehicle relative to wheeled supports with a simple, efficient and effective means for leveling the sprung mass relative to its wheeled support.

Another object is to provide a closed hydraulic suspension system for a vehicle including cross-connected hydraulic struts with means for transferring hydraulic fluid selectively between cross-connected systems for leveling purposes, avoiding the necessity for reservoirs and supplying of makeup hydraulic fluid.

Another object is to provide a single connection passage between cross-connected hydraulic suspension systems with selective opening and closing of the passage and pumping of hydraulic fluid through the passage in selected direction to transfer fluid between the systems in order to effect leveling of a sprung mass relative to wheeled supports.

Other objects, features and advantages of the present invention will be apparent from the following description of a preferred embodiment thereof.

DESCRIPTION OF THE DRAWINGS

The FIGURE of the drawings is a schematic illustration of one pair of hydraulic struts and associated parts illustrative of the invention, with portions of the sprung mass and wheeled support shown in broken view.

DESCRIPTION OF THE PREFERRED EMBODIMENT

In the drawings, there is illustrated a hydraulic suspension system 10 interposed between a vehicle frame 12 and an axle frame 14, upon which wheels are supported in conventional fashion. The hydraulic system 10 is of the type employing hydraulic struts filled with hydraulic fluid pressurized by a gas-filled accumulator to provide a spring rate for the systems between the axle and the vehicle frame, body, load and contents. While the invention is illustrated for a vehicle having an axle upon which wheels would be mounted, it is equally applicable to vehicles having individually mounted wheels. The vehicle involved may be an off-highway truck or wagon or vehicles of the type normally used upon highways.

Referring to the FIGURE of the drawing, a lefthand hydraulic strut system 16 and a righthand hydraulic strut system 18 are intended to be placed across the vehicle from each other and cross-connected. The lefthand system includes a strut 20 having a hydraulic cylinder 21 out of which extends a piston rod 22 carrying a piston 23 on its inner end within the cylinder and equipped with seals on its periphery in sliding contact with the interior of the cylinder. The cylinder is provided with a pivot mount 24 to the vehicle frame 12, and the rod is provided with a pivot connection 25 to the axle 14. The piston 23 inside the cylinder 21 divides the interior of the cylinder into separate hydraulic fluid chambers 26 above the piston and 27 below the piston about the rod 22.

The righthand strut system 18 has parts similar to that described above for the lefthand strut. The strut 30 has a cylinder 31, piston rod 32 carrying a piston 33 inside the cylinder as previously described. The cylinder is attached to the frame at pivot 34 and the piston rod attached to the axle 14 at pivot 35. The piston is provided with seals which travel on the interior of the cylinder dividing the interior into separate hydraulic chambers 36 and 37.

The cross connection of the hydraulic struts across the vehicle is accomplished by hydraulic conduits communicating with the chambers described. Thus, chamber 36 in the righthand strut is connected to chamber 27 in the lefthand strut through the hydraulic lines 40 and 42. Thus, the upper end of the righthand strut is connected to the lower end of the lefthand strut, and a similar hydraulic pressure will exist throughout the system, including both chambers and their connecting conduits. A gas-filled accumulator 41 of known construction is connected into the conduits 40 and 42 providing a relatively constant pressure on the hydraulic fluid in the chambers and connecting conduits. The connected conduit chambers 27 and 36 and accumulator 41 constitute one hydraulic suspension system in the present invention.

The upper chamber 26 of the lefthand strut is connected to the lower chamber 37 of the righthand strut through conduits 50 and 52. Another gas-filled accumulator 51 is connected to the conduits 50 and 52 for the purpose of providing pressure upon the hydraulic fluid in the chambers 26 and 37. These chambers, their connecting conduits and the accumulator 51 constitute a second hydraulic suspension system.

The cross-connected hydraulic struts operate to provide stiffness in the suspension system against rolling of the vehicle while it is in a turn. The sprung mass of a vehicle negotiating a turn will subject the strut on the outside of the turn to compressive forces, such that the frame tends to approach toward the axle 14. As an example, if the lefthand strut were subjected to such compressive force, fluid pressure in the upper chamber 26 would increase and be conveyed through the lines 50 and 52 to the chamber 37 at the lower end of the righthand strut. The increase in pressure in chamber 37 would tend to draw the piston further into the cylinder in the righthand strut, thus compensating for the vertical component of force impressed upon the lefthand strut. As one can immediately observe, additional stiffness and resistance to shifting of the sprung mass relative to its wheeled supports is accomplished through the cross-connected hydraulic struts. At the same time, the vertical stiffness in normal straight motion of the vehicle is not materially affected since the accumulators provide the systems with the desired spring rate.

Seals utilized on pistons and hydraulic strut systems are not infallible, and some leakage of fluid can usually be expected under shock load conditions and with increased wear and useage through passage of time. Some seals may pass a greater volume of hydraulic fluid than others so that in time the sprung mass of a vehicle upon its wheeled support may become unlevel undesirably. The systems employed herein are closed systems to which hydraulic fluid is neither added or subtracted. A leveling of the sprung mass relative to its wheels may be accomplished by transfer of fluid between the systems employed.

In the present invention, a simple and efficient means for transferring fluid between the cross-connected systems is provided by a cross connection between the systems, controllable manually. Referring to the drawings, a branch line 55 from line 50 is connected to an on-off valve 56 diagrammatically illustrated as controllable by handle 57 for movement between open and closed positions. A further branch line 58 connects the valve to a pump 59 shown with a handle 60 for hand operation in direction of the arrow 61 to move fluid through the branch 62 connected to line 42, as desired. In operation, the valve 56 may be opened and the pump operated in a fashion to move fluid from the system 16 into the system 18, or in the opposite direction, selectively. The transfer of fluid between the two systems 16 and 18 can be continued until a level condition of the sprung mass relative to the wheeled support is observed. The pump may be a simple hand-operated pump or may be motor driven, as desired. In off-road vehicles, a mechanical drive from another motor may be provided or an electric motor may be utilized to drive the pump.

The lines, valve and pump may be located in conjunction with the hydraulic strut systems to be conveniently accessible. In some equipment of the off-road variety, it may be desirable to place the valve and pump near one side of the vehicle. Connections of the lines 55 and 62 may be directly made to one or the other of the hydraulic struts or at any convenient location in the cross-connection lines 40 and 50.

We claim:

1. In a vehicle suspension system having hydraulic struts between a sprung mass and its wheeled supports with hydraulic chambers in the struts cross-connected across the vehicle, means for leveling the sprung mass relative to its wheeled support comprising:
   a pair of hydraulic conduits extending across the vehicle and cross-connecting the hydraulic chambers of the struts to provide horizontal stability of the sprung mass upon the wheeled support, each conduit and connected chambers providing a separate hydraulic system,
   a controllable conduit communicating only with and connecting said hydraulic systems,
   a valve controlling fluid flow through said controllable conduit, and
   a pump for moving fluid from one hydraulic conduit to the other selectively.

2. Means for leveling a sprung mass as specified in claim 1 wherein the controllable conduit extends between and connects said systems by connection to the cross-connecting hydraulic conduits.

3. Means for leveling a sprung mass as specified in claim 1 in which each separate hydraulic system is a closed system and said controllable conduit is arranged to transfer hydraulic fluid only between said systems.

4. Means for leveling a sprung mass as specified in claim 3 in which each separate hydraulic system is provided with a pneumatic-hydraulic accumulator in communication with the system providing the latter with a spring rate.

5. Means for leveling a sprung mass as specified in claim 1 in which the pump for moving fluid through the controllable conduit is a hand pump controllable in direction of flow through the conduit.

6. Means for leveling a sprung mass as specified in claim 1 in which the pump for moving fluid through the controllable conduit is a motor driven pump controllable in direction of flow through the conduit.

7. A suspension system for a wheeled vehicle having a sprung mass supported upon wheeled supports, comprising:
   hydraulic fluid filled struts extending between the sprung mass and each wheeled support, each strut having a cylinder, a piston rod and a piston in the cylinder fixed to the rod with the cylinder and rod each pivoted respectively to one of said mass and wheeled support, said piston dividing the cylinder interior into separate hydraulic fluid cap end and rod end chambers, each variable in volume upon movement of the piston in the cylinder,
   fluid conduits respectively connecting cap end to rod end fluid chambers of each pair of struts across the vehicle and an accumulator operatively connected with each such fluid conduit forming a pair of hydraulic systems providing a spring rate for the mass supported,
   and conduit means connecting said pair of fluid systems only with each other and having a valve and a pump therein for selective transfer of hydraulic fluid from one to the other of said systems for leveling the sprung mass relative to its wheeled support.

* * * * *